US011483151B1

(12) United States Patent
El-Khatib et al.

(10) Patent No.: US 11,483,151 B1
(45) Date of Patent: Oct. 25, 2022

(54) METHOD AND SYSTEM FOR COMPUTING LARGE-DEGREE ISOGENIES WITH AN ODD DEGREE

(71) Applicant: PQSecure Technologies, LLC, Boca Raton, FL (US)

(72) Inventors: Rami El-Khatib, Boca Raton, FL (US); Brian Craig Koziel, Plano, TX (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/611,297

(22) PCT Filed: Jul. 16, 2021

(86) PCT No.: PCT/US2021/041956
§ 371 (c)(1),
(2) Date: Nov. 15, 2021

(51) Int. Cl.
*H04L 9/30* (2006.01)

(52) U.S. Cl.
CPC .......... *H04L 9/3066* (2013.01); *H04L 9/3033* (2013.01)

(58) Field of Classification Search
CPC ... H04L 9/3066; H04L 9/0816; H04L 9/0643; H04L 9/3033; G06F 7/725; G06F 16/9014
See application file for complete search history.

(56) References Cited

U.S. PATENT DOCUMENTS

| | | | | |
|---|---|---|---|---|
| 7,382,876 B2* | 6/2008 | Lauter | ................... | H04L 9/0643 380/42 |
| 7,499,544 B2* | 3/2009 | Jao | ........................ | H04L 9/3257 380/30 |
| 7,991,154 B2* | 8/2011 | Longa | ..................... | G06F 7/725 380/30 |
| 7,991,162 B2* | 8/2011 | Longa | ..................... | G06F 7/725 708/492 |
| 8,731,187 B2* | 5/2014 | Lauter | ................... | H04L 9/3066 713/180 |
| 2005/0094806 A1* | 5/2005 | Jao | ........................ | H04L 9/3257 380/30 |
| 2006/0248338 A1 | 11/2006 | Jao et al. | | |

(Continued)

*Primary Examiner* — Samson B Lemma
(74) *Attorney, Agent, or Firm* — Mark C. Johnson; Johnson Dalal

(57) ABSTRACT

A computer-implemented method and system for computing large-degree isogenies of a base degree raised to a power of form $\ell^{ak+b}$ and including the steps of providing at least one computer processor resident on an electronic computing device, performing, with the at least one processor, a large-degree isogeny by chaining together a plurality of scalar point multiplications, a plurality of isogeny computations, and a plurality of isogeny evaluations, wherein the large-degree isogeny includes a sequence storing at least one pivot point computed by one of the plurality of scalar point multiplications followed by an isogeny computation of degree $\ell^b$, performing at least one of the plurality of isogeny evaluations following one of the plurality isogeny computations, and performing an $\ell^{ak}$-isogeny through another sequence of $\ell^a$ isogeny computations.

17 Claims, 9 Drawing Sheets

(56) References Cited

U.S. PATENT DOCUMENTS

| | | | |
|---|---|---|---|
| 2009/0074178 A1* | 3/2009 | Longa | G06F 7/725 |
| | | | 380/28 |
| 2009/0287756 A1* | 11/2009 | Lauter | G06F 7/725 |
| | | | 708/492 |
| 2009/0323933 A1* | 12/2009 | Longa | G06F 7/725 |
| | | | 380/30 |
| 2010/0082992 A1* | 4/2010 | Broker | H04L 9/3073 |
| | | | 713/176 |
| 2012/0008780 A1* | 1/2012 | Al-Somani | G06F 7/725 |
| | | | 380/255 |
| 2017/0085879 A1 | 3/2017 | Minoo et al. | |
| 2018/0323973 A1* | 11/2018 | Soukharev | G06F 7/725 |
| 2020/0014534 A1 | 1/2020 | Garcia Morchon et al. | |
| 2020/0259648 A1* | 8/2020 | Koziel | H04L 9/0637 |

* cited by examiner

METHOD AND SYSTEM FOR COMPUTING LARGE-DEGREE ISOGENIES WITH AN ODD DEGREE

FIELD OF THE INVENTION

The present invention relates generally to hardware, systems, implementation, and methods directed towards efficiently computing a large-degree isogenies of an odd degree for use in public-key cryptosystems.

BACKGROUND OF THE INVENTION

Isogeny-based cryptography is seen as a new avenue for public-key cryptosystems that is resistant to quantum computers. Public-key cryptosystems are cryptographic systems in which a public key and private key are utilized to achieve some cryptographic application such as encryption or authentication. These cryptosystems are heavily used in the Internet, encrypted messaging services, and many more.

An isogeny is a morphism of algebraic groups that is surjective and has a finite kernel. For cryptography, the primary application of isogenies has been for isogenies of elliptic curves. Examples of isogeny-based cryptosystems include, but are not limited to, the supersingular isogeny Diffie-Hellman (SIDH) key exchange, the commutative supersingular isogeny Diffie-Hellman (CSIDH) key exchange, the supersingular isogeny key encapsulation (SIKE) mechanism, and the short quaternion and isogeny signature (SQISign). Among these schemes, a large-degree isogeny is typically performed as a major operation. The large-degree isogeny can be broken up as a chain of smaller isogenies.

Efficiently performing large-degree isogenies are a computationally complex task that can be optimized depending on the form of the isogeny chain. One particular form where the large-degree isogeny is composed of an odd number of small isogenies could be optimized further Therefore, a need exists to overcome the problems with the prior art as discussed above.

SUMMARY OF THE INVENTION

The invention provides a hardware, system, implementation, and method for efficiently computing large-degree isogenies with an odd degree. Here, we define an "efficient" implementation of a large-degree isogeny as one that requires fewer total operations than the state-of-the-art.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

The invention provides a computer-implemented method for computing large-degree isogenies of a base degree raised to a power of form $\ell^{a+b}$ where a, b, and c are integers with $0<b<a$ that overcomes the hereinafore-mentioned disadvantages of the heretofore-known devices and methods.

With the foregoing and other objects in view, there is provided, in accordance with the invention, a computer-implemented method for computing large-degree isogenies of a base degree raised to a power of form $\ell^{ak+b}$ is disclosed that includes providing at least one computer processor resident on an electronic computing device, performing with the at least one processor a large-degree isogeny by chaining together a plurality of scalar point multiplications, a plurality of isogeny computations, and a plurality of isogeny evaluations, wherein the large-degree isogeny includes a sequence storing at least one pivot point computed by one of the plurality of scalar point multiplications followed by an isogeny computation of degree $\ell^b$, performing with the at least one processor at least one of the plurality of isogeny evaluations following one of the plurality isogeny computations, and performing with the at least one processor an $\ell^{ak}$-isogeny through another sequence of $\ell^a$ isogeny computations.

In accordance with another feature, an embodiment of the present invention includes the large-degree isogeny including the storing of the at least one pivot point computed by one of the plurality of scalar point multiplications followed by the isogeny computation of a degree $\ell^b$ and the plurality of isogeny evaluations.

In accordance with a further feature of the present invention, the base degree is a small prime number.

In accordance with an additional feature of the present invention, the integer a is 2 and the integer b is 1, resulting in a large-degree isogeny of an odd degree.

In accordance with yet another feature of the present invention, the large-degree isogeny is performed with arithmetic defined over a finite field of size that includes one of: $2^{216}3^{137}-1$, $2^{250}3^{159}1$, $2^{305}3^{192}-1$, $2^{372}3^{239}-1$, $2^{191}\,3^{172}-1$, or $2^{273}3^{172}-1$.

In accordance with a further feature of the present invention, the large-degree isogeny is performed as part of an isogeny-based cryptosystem utilizing the computer processor resident on the electronic computing device.

Also in accordance with the present invention, a computer-implemented method for computing large-degree isogenies of a base degree raised to a power of form $\ell^{ak+b}$ where a, b, and c are integers with $0<b<a$, and including the steps of providing at least one computer processor resident on an electronic computing device, performing a $\ell^b$ scalar point multiplication to acquire a point of order $\ell^{ak}$, performing with the at least one processor a $\ell^{ak}$ isogeny by chaining together a plurality of scalar point multiplications, a plurality of isogeny computations, and a plurality of isogeny evaluations, performing with the at least one processor at least one of the plurality of isogeny evaluations following one of the plurality isogeny computations, and performing with the at least one processor an $\ell^{ak}$-isogeny through another sequence of $\ell^a$ isogeny computations.

Also in accordance with the present invention, a computer processing system is disclosed for computing large-degree isogenies of a base degree raised to a power of form $\ell^{ak+b}$, where a, b, and c are integers with $0<b<a$, and includes at least one computer processor resident on an electronic computing device and operably configured to execute computer-readable instructions programmed to perform a large-degree isogeny by chaining together a plurality of scalar point multiplications, a plurality of isogeny computations, and a plurality of isogeny evaluations, wherein the large-degree isogeny includes a sequence storing at least one pivot point computed by one of the plurality of scalar point multiplications followed by an isogeny computation of degree $\ell^b$. Additionally, the computer-readable instructions are programmed to perform at least one of the plurality of isogeny evaluations following one of the plurality isogeny computations and an $\ell^{ak}$-isogeny through another sequence of $\ell^a$ isogeny computations.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
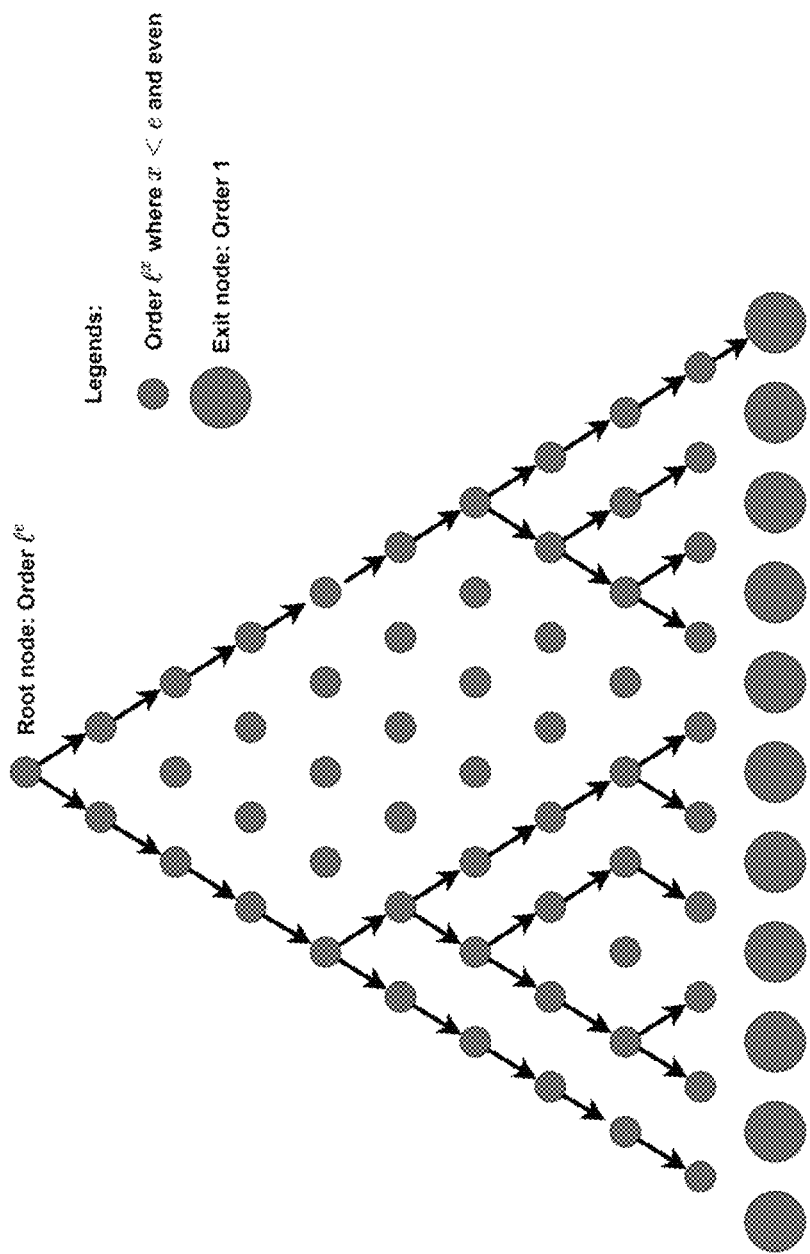
FIG. 1 is a diagram depicting a directed acyclic graph for visualizing the large-degree isogeny computation. Starting from a root node, the goal is to traverse to the leaf nodes to compute an isogeny where there is a cost to move left or right. Small nodes have an odd order and medium nodes have an even order.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a hardware, system, implementation, and method for efficiently computing large-degree isogenies with an odd degree. The primary known application for these large-degree isogenies is for isogeny-based cryptosystems. Isogeny-based cryptosystems have been shown to be useful for a key establishment and authentication schemes. Among these, isogenies of elliptic curves have additionally been found to be the most useful and successful. An isogeny can be thought of as a mapping between elliptic curves that preserves the point at infinity.

For security and efficiency, isogeny-based cryptosystems typically utilize a large-degree isogeny that is composed of many small-degree isogenies. This invention provides a new method to perform large-degree isogenies that are composed of an odd number of small-degree isogenies by grouping them into medium-degree isogenies with a remainder. This new method is more efficient in that it requires fewer computations.

Examples of isogeny-based cryptosystems include, but are not limited to, the supersingular isogeny Diffie-Hellman (SIDH) key exchange, the commutative supersingular isogeny Diffie-Hellman (CSIDH) key exchange, the supersingular isogeny key encapsulation (SIKE) mechanism, and the short quaternion and isogeny signature (SQISign). The computational conjecture of these schemes is that it is easy to compute an isogeny φ between two elliptic curves given a kernel, but it is difficult to find the isogeny between two elliptic curves. Of these, this invention applies to the large-degree isogeny used in SIDH and SIKE when the large-degree isogeny is composed of medium-sized isogenies with some remainder.

An elliptic curve isogeny φ: E→E' over a finite field $F_q$ is defined as a non-constant rational map from $E(F_q)$ to $E'(F_q)$ that preserves the point at infinity. This is a mapping of points from one elliptic curve to another that changes the elliptic curve's isomorphism class. A unique isogeny can be computed by Velu's formulas over a kernel, φ: E→E/⟨kernel⟩. The degree of an isogeny is its degree as a rational map. Bigger degree isogenies are generally more computationally expensive. An isogeny computation is a mapping from elliptic curve to an isogenous elliptic curve. An isogeny evaluation is a mapping from a point on an elliptic curve to the corresponding point on an isogenous elliptic curve.

For efficiency, SIDH and SIKE make use of primes of the form $\ell_a^{e_a} \ell_b^{e_b} f \pm 1$, where $\ell_a$ and $\ell_b$ are small primes and f is chosen to make the number prime. For a key establishment session between Alice and Bob, Alice computes the large-degree isogeny $\ell_a^{e_a}$ and Bob computes the large-degree isogeny $\ell_b^{e_b}$. For efficiency, these large-degree isogenies are computed as a chain of smaller isogenies. For instance, Alice will compute the large-degree isogeny $\ell_a^{e_a}$ as an $e_a$-length chain of $\ell_a$ isogenies. This is the most intense computation in SIDH and SIKE and can be optimized. $\ell_a$ and $\ell_b$ are small primes to keep the scheme efficient. For instance, $\ell_a=2$ and $\ell_b=3$ are the most frequently used primes since they are the most efficient. A small prime is any prime integer less than 100. For example, 2, 3, 5, 7, 11, 13, 17, 19, 23, 29, 31, 37, 41, 43, 47, 53, 59, 61, 67, 71, 73, 79, 83, 89, 97 are small primes.

For simplicity, the base degree of an isogeny is given as $\ell$. This is considered a "small" isogeny. A "medium" isogeny is an isogeny of the form $\ell^x$, where x>1. For instance, an $\ell^2$ isogeny is a medium isogeny. The "large-degree" isogeny is the full degree of the isogeny as needed for SIDH, SIKE, or any isogeny-based scheme. This is denoted as $\ell^e$. With these definitions, it is not required that x≤e.

Given a point R of order $\ell^e$, the large-degree isogeny tree problem is to compute the large-degree isogeny as efficiently as possible. Starting on curve $E_0$ with kernel point $R_0$ of order $\ell^e$, the large-degree isogeny can be computed iteratively by initializing $E_0=E$ and $R_0=R$ and then computing 0≤i<e iterations of degree-$\ell$ isogenies $\varphi_i$: $E_i \rightarrow E_{i+1}$ with kernel $[\ell^{e-i-1}]R_i$, and then updating $R_{i+1}=\varphi_i(R_i)$. This computational problem can be visualized as a directed acyclic graph, similar to a binary tree, which is shown in FIG. 1. Here, we start at a root node which has order $\ell^e$. To traverse this graph, a point multiplication by $\ell$ moves to the left an $\ell$-isogeny evaluation moves to the right. The goal is to compute an $\ell$-isogeny at each of the leaf nodes which have an order of $\ell$. Any number of pivot points, or strategic points can be stored and pushed through $\ell$-isogenies to reduce the number of point multiplications and isogeny evaluations that are computed.

A strategy is a sequence of point multiplications, isogeny evaluations, and isogeny computations that compute the $\ell^e$ isogeny. There is no advantage to traversing each node. An optimal strategy is one of least cost. This optimal strategy depends on the relative cost of scalar point multiplication by $\ell$ and $\ell$-degree isogeny evaluations. Pivot points are stored points that can reduce the cost of traversal but will require an $\ell$-degree isogeny evaluation after each isogeny computation. The optimal strategy for a large tree can be found by combining the optimal strategy of both subtrees.

In addition to computing a series off isogenies, there is also the option to compute $\ell^x$ isogenies, where x is some integer. For instance, to compute the large-degree isogeny $2^{64}$, one can compute 64 2-isogenies or 32 4-isogenies. To compute a 4-isogeny, the isogeny tree strategy performs point multiplications or isogeny evaluations to get a point of order 4. An example of this is shown in FIG. 2.

Here, the small nodes have an odd order and the medium nodes have an even order. The largest nodes at the bottom are the points of order 1. FIG. 2 illustrates a strategy that uses only $\ell$-isogenies and FIG. 3 illustrates a strategy that uses only $\ell^2$-isogenies. These can be raised to a higher power. If $\ell^2$-isogenies or greater isogenies are more efficient to compute than $\ell$-isogenies, then a more efficient strategy can be made that uses these higher power isogenies.

Figure 2:
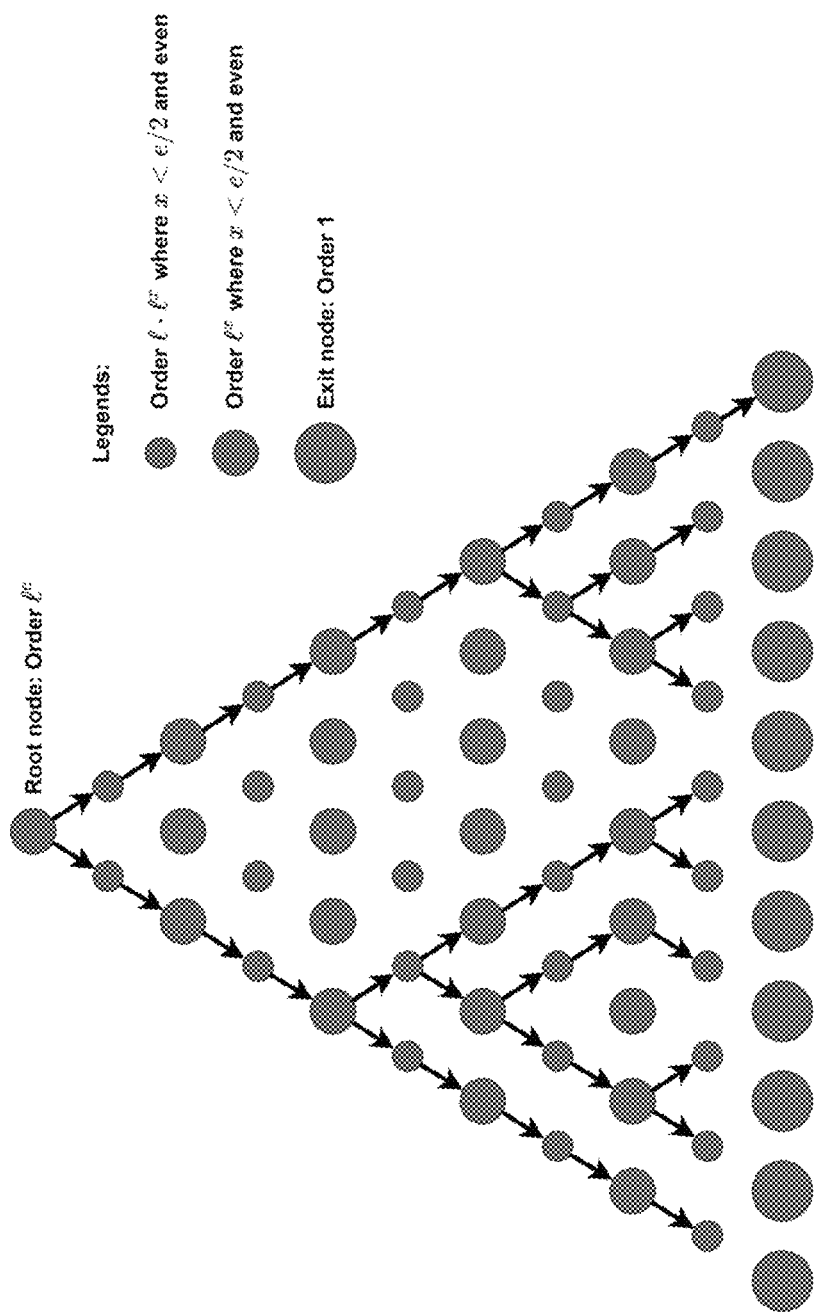
FIG. 2 is a diagram depicting a directed acyclic graph where the large-degree isogeny is of an even order. This shows one state-of-the-art approach for computing the large-degree isogeny as a chain of a base degree ($\ell$) isogenies.
Figure 3:
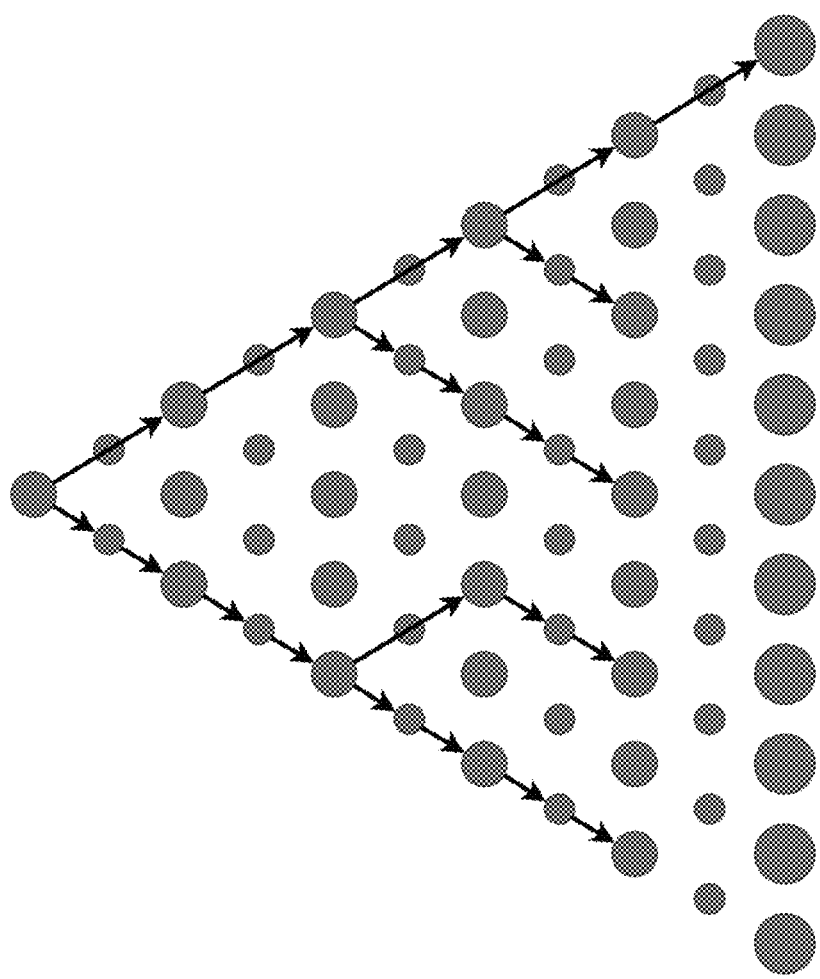
FIG. 3 is a diagram depicting a directed acyclic graph where the large-degree isogeny is of an even order. This shows one state-of-the-art approach for computing the large-degree isogeny as a chain of a base degree squared ($\ell^2$) isogenies.
Figure 4:
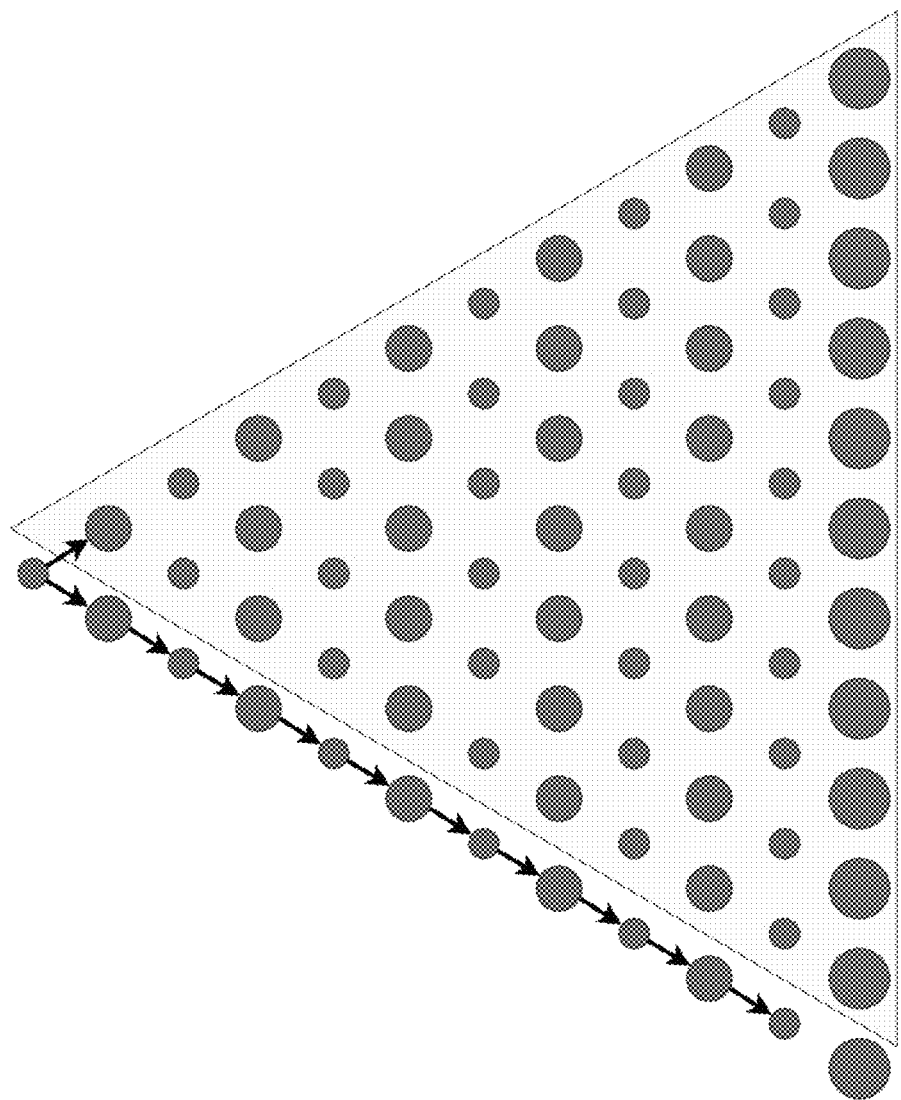
FIG. 4 is a diagram depicting the state-of-the-art method for computing the isogeny problem when the large-degree isogeny is of an odd order. The state-of-the-art approach is to compute a single ($\ell$) small isogeny, then continue performing the rest of the large-degree isogeny as medium ($\ell^2$) isogenies.

FIGS. 2-3 both assume an even power for the isogeny. Another problem could have an odd power of the form $\ell^{2k+1}$ which could also be written as $\ell \circ \ell^{2k}$. If $\ell^2$-isogenies are more efficient than $\ell$-isogenies, then there are a few different ways to optimize this case for the isogeny tree problem. The state-of-the-art solution to this problem is to compute an initial $\ell$-isogeny followed by a chain of $\ell^2$-isogenies according to a strategy, which is shown in FIG. 4. This method is wasteful. For instance, one 610-bit prime used in a parameter set for SIKE is of the form $p=2^{305}3^{192}-1$. The large-degree isogeny $2^{305}$ is computed by first performing a 2-isogeny and then an optimized strategy for computing 152 4-isogenies. This initial 2-isogeny costs 304 point doublings which must then be mostly recomputed for the following 4-isogenies.

More generally, an efficient strategy can be constructed for a large-degree isogeny by composing it as a sequence of medium isogenies. In the example above, $\ell^2$-isogenies were used. As yet another example, consider computing a large-degree isogeny of $\ell^{24}$. One can compose this large-degree isogeny as a sequence of 24 $\ell$-isogenies, 12 $\ell^2$-isogenies, 8 $\ell^3$-isogenies, 6 $\ell^4$-isogenies, 4 $\ell^6$-isogenies, 3 $\ell^B$-isogenies, 2 $\ell^{12}$-isogenies, or even 1 $\ell^{24}$-isogeny. Furthermore, this is not limited to one type of isogeny. Additional options include 3 $\ell^3$-isogenies with 3 $\ell^5$-isogenies or 2 $\ell^2$-isogenies with 2 $\ell^4$-isogenies and 1 $\ell^2$-isogeny. The only restriction is that the total number of isogenies adds up to the large-degree isogeny. When determining which strategy is best, the cost of these $\ell^x$-isogenies is taken into account.

This invention proposes a new method to address this cost to efficiently compute large-degree isogenies aggregated with isogenies of mixed degree. The case here is when a medium degree isogeny is the most efficient and there is some remainder. In the odd power example with $\ell^{2k+1}$, the remainder was 1, so an additional $\ell$-isogeny is required. More generally, the large-degree isogeny can be of the form $\ell^{ako}\ell^b = \ell^{ak+b}$, where $\ell^a$ is the most efficient medium isogeny to compute, $\ell^b$ is the remaining small or medium isogeny to perform with 0<b<a, and k is the number of medium isogenies to perform as part of the strategy. Our embodiments of the invention target this general case and use examples to further elaborate on the advantages of this innovation.

Figure 5:
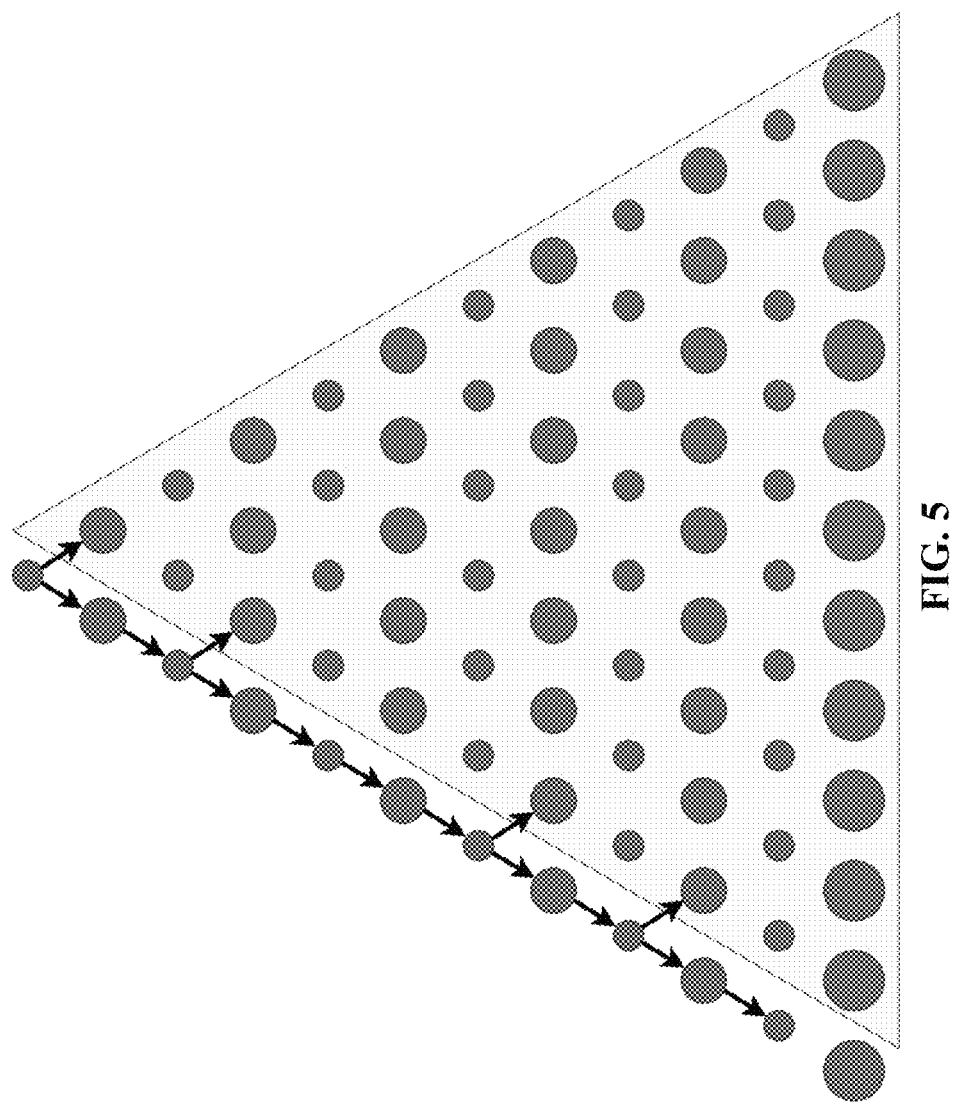
FIG. 5 is a diagram depicting one embodiment of the invention where specific pivot points are stored as the first small ($\ell$) isogeny is computed, for efficient use when computing the large-degree isogeny as medium ($\ell^2$) isogenies.

The first embodiment of this invention is to start by performing the remainder $\ell^b$-isogeny while storing pivot points to avoid recomputing point multiplications for an optimal strategy to compute the chain of $\ell^a$-isogenies. This is illustrated in FIG. 5 for the case of an even power for the isogeny. The strategy dictates the first sequence of pivot points that are stored as the point of order $\ell^{2k}$ is multiplied by $\ell^2$. Before the strategy is applied, a single $\ell$-isogeny is computed over a point of order $\ell$ that is obtained by performing 2k point multiplications by $\ell$. As these point multiplications are performed, points that have an order $\ell$ times that of the first sequence of pivot points are stored. After the first $\ell$-isogeny is computed, an $\ell$-isogeny evaluation is applied to these stored points that divides the point orders by $\ell$, resulting in the first sequence of pivot points. The optimal strategy for the $\ell^2$-isogenies is then followed. For the large-degree isogeny $2^{305}$, this approach saves about 303 point doublings at the cost of applying 2-isogeny point evaluations to each pivot points. A simple estimate for an optimal strategy here may store 10 pivot points, so this exchanges 303 point doublings for 9 2-isogeny point evaluations, which is typically significantly more efficient.

Figure 6:
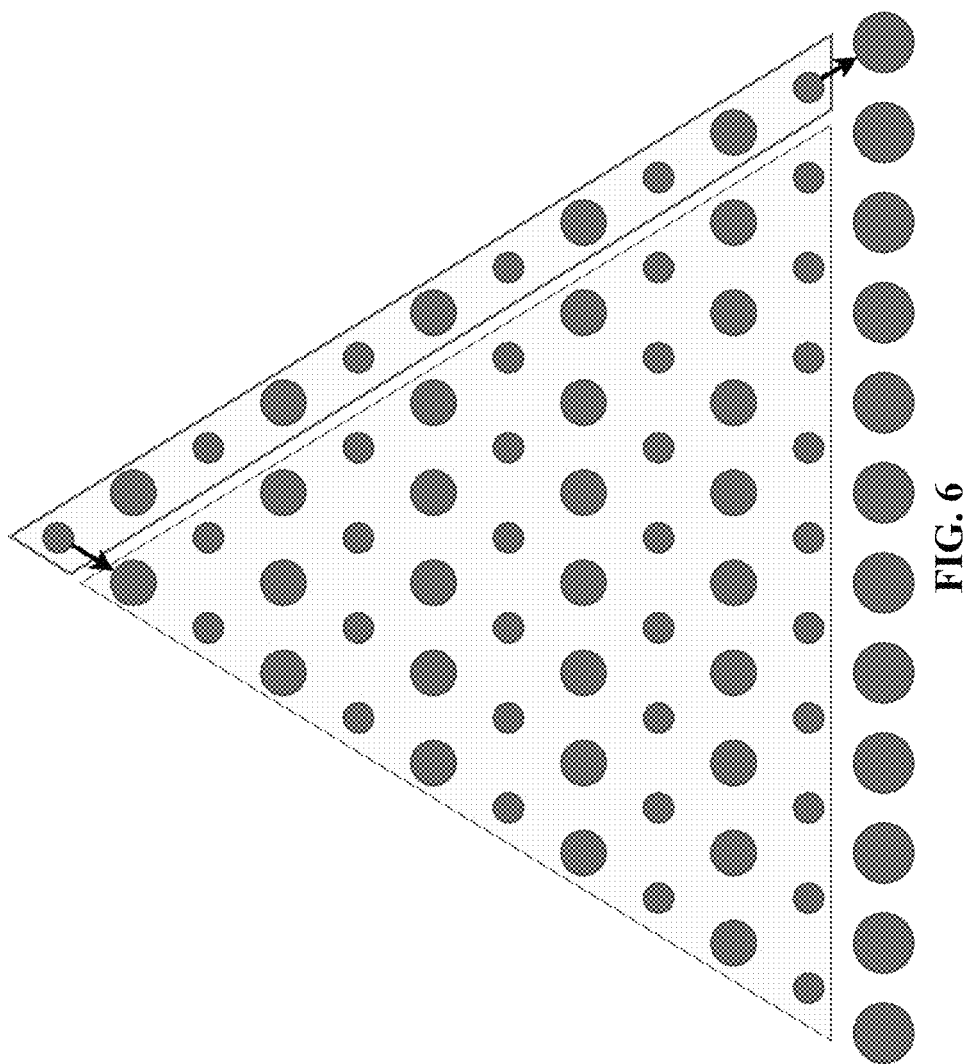
FIG. 6 is a diagram depicting one embodiment of the invention where the small ($\ell$) isogeny is delayed until the final isogeny, such that the large-degree isogeny can be constructed by a sequence of medium ($\ell^2$) isogenies and then the final ($\ell$) isogeny.

The second embodiment of this invention is to perform a strategy that involves a chain of medium-sized $\ell^a$-isogenies where at some step of the strategy the remainder $\ell^b$-isogeny is computed. Our example here is shown in FIG. 6 as a chain of $\ell^2$-isogenies where at some step of the strategy an $\ell$-isogeny is computed. Here, the root point is of the order $\ell^{2k+1}$ so multiplying the point by $\ell$ will return a point of order $\ell^{2k}$ that can be efficiently used to compute an $\ell^{2k}$ large-degree isogeny by using a strategy. At some step of this strategy, the $\ell$-isogeny can be computed. For example, this could be computed as the last isogeny in the chain or directly in the middle. Similar to the first embodiment, the use of a strategy here will exchange many point multiplications by $\ell$ for isogeny evaluations by $\ell$. This use of a strategy could also be useful for applications where space is limited and only so many pivot points can be stored.

The third embodiment of this invention is to perform an initial point multiplication by the remainder $\ell^b$ followed by a strategy for the remaining $\ell^a$ isogenies. The key idea here is that the point multiplication by $\ell^b$ here is used to bypass the need to compute the final $\ell^b$-isogeny. Similar to embodiments 1 and 2, this embodiment saves a major amount of point multiplications by $\ell^b$ that are needed to compute the $\ell^b$-isogeny. This embodiment is unique in that it does not perform the $\ell^b$-isogeny, saving additional $\ell$-isogeny evaluations and a single $\ell^b$-isogeny computation. This is useful for some schemes where the remainder $\ell^b$-isogeny does not add security. For instance, SIDH and SIKE relies on schemes where $\ell_a^{e_a} \approx \ell_b^{e_b}$ so that the size, complexity, and security of the large-degree isogenies are similar. If one large-degree isogeny tree were much larger than the other, then computing an $\ell^b$-isogeny may not be necessary.

Figure 7:
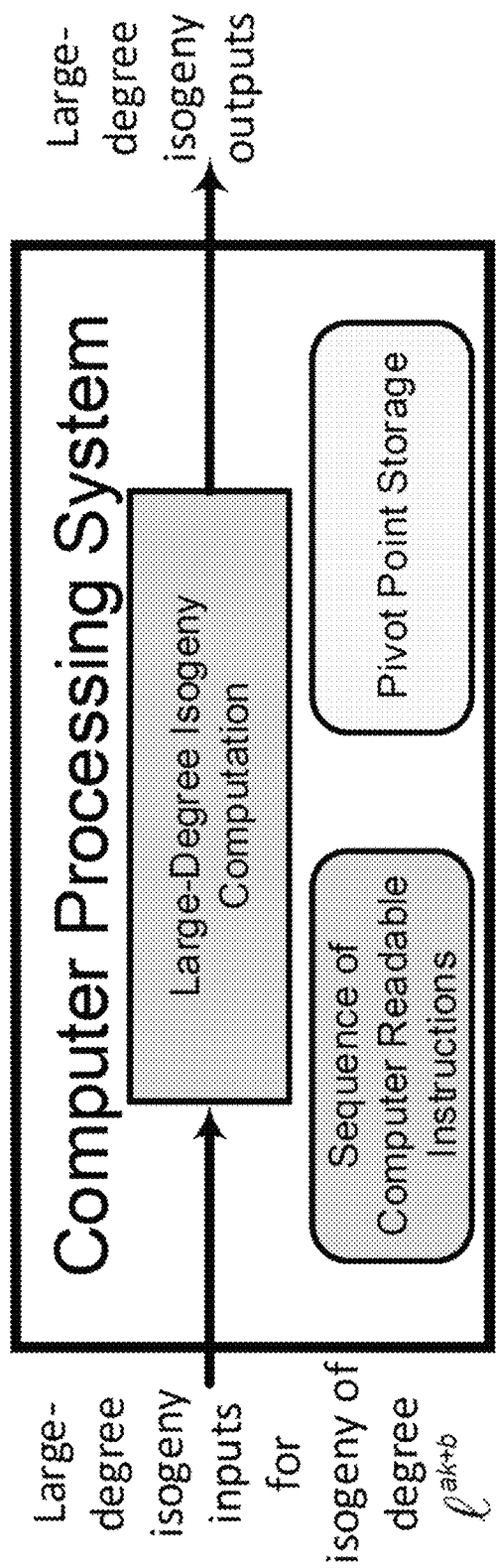
FIG. 7 is a schematic depicting an architecture for this invention, namely that upon receiving inputs for a large-degree isogeny of the form $\ell^{ak+b}$ will execute a sequence of computer readable instructions and store at least one pivot point to perform the large-degree isogeny.
Figure 8:
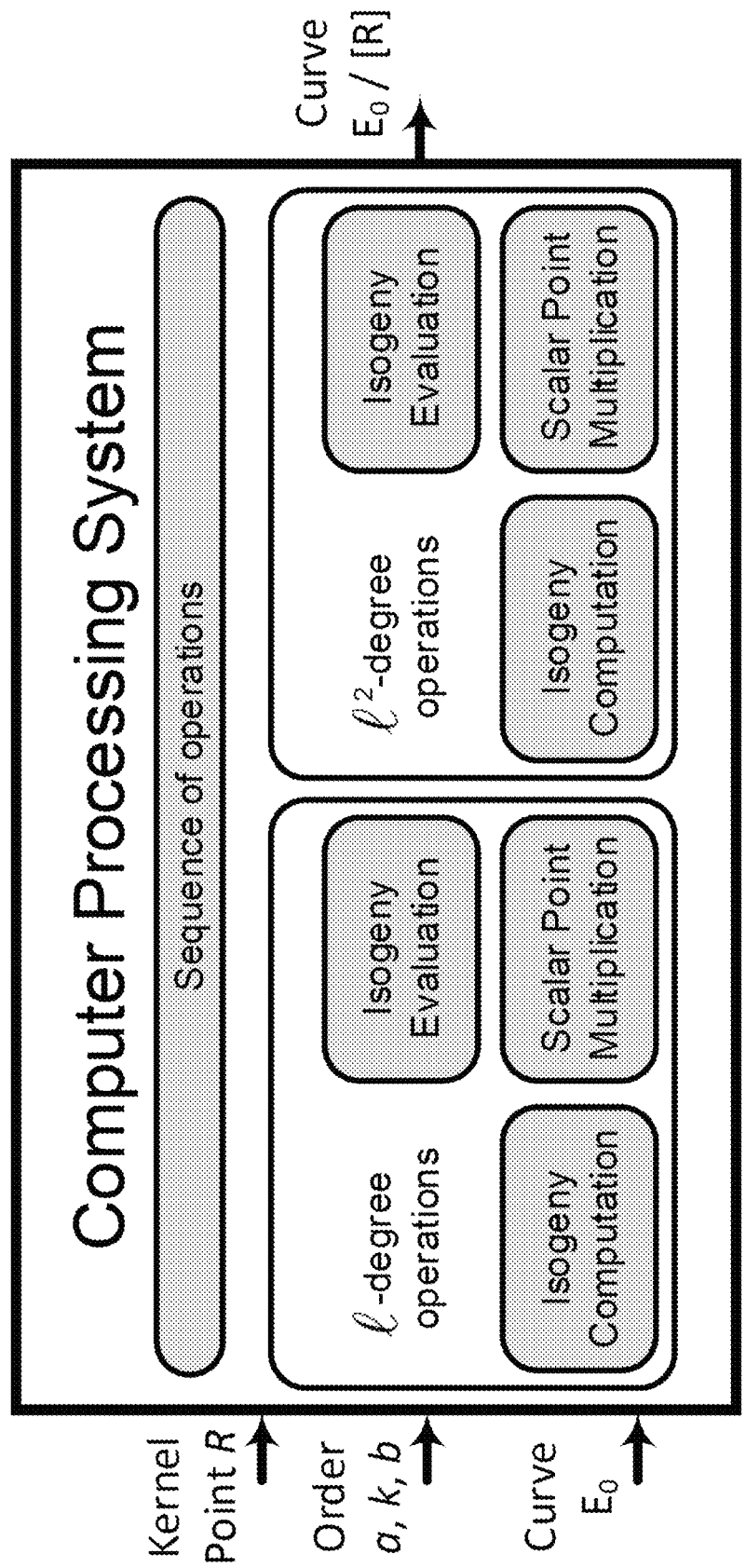
FIG. 8 is a schematic depicting an architecture for this invention, namely a computer processor resident on an electronic computing device operably configured to compute a large-degree isogeny of an odd degree $\varphi: E_0 \rightarrow E_0/\langle R \rangle$ by using some sequence of $\ell$ and $\ell^2$ isogeny and point multiplication operations.

Lastly, two architecture embodiments of this invention are shown in FIG. 7 and FIG. 8. In FIG. 7, a computer processing system is shown that is operably configured to perform a large-degree isogeny of the form $\ell^{ak+b}$, where a, b, and c are integers with 0<b<a. This large-degree computation is computed by the computer processing system executing a sequence of computer readable instructions that includes storing at least one pivot point, a point that is necessary for a large-degree isogeny strategy. Upon completion of the computation, the computer processing system outputs the large-degree isogeny results. Inside this computer processing system, $\ell^x$ degree operations can be called, whether through specific accelerators or subroutines stored and used with a controller. For efficient use, the $\ell^{ak}$ isogeny can be broken down into a highly optimized strategy of $\ell^a$ isogenies that can be stored in the sequence of operations. At some point in this sequence, such as before, during, or after, the $\ell^b$ isogeny can be called. To reduce the computational complexity, pivot points can be stored inside the computer processing system during the $\ell^a$ or $\ell^b$ operations.

FIG. 8 is intended to illustrate more details of one such architecture, this time to execute a large-degree isogeny of an odd power where a=2 and b=1. Here, the inputs are a kernel point R of order $\ell^{2k+1}$, integers a, b, and k, and an input curve $E_0$. This architecture computes the large-degree isogeny resulting in a new curve, $\varphi: E_0 \to E_0/\langle R \rangle$. As is explained in the previous embodiments of this invention, this can efficiently be done by this computer processing system by using a sequence of $\ell$-isogeny and $\ell^2$-operations, including evaluations, computations, and scalar point multiplications.

Figure 9:
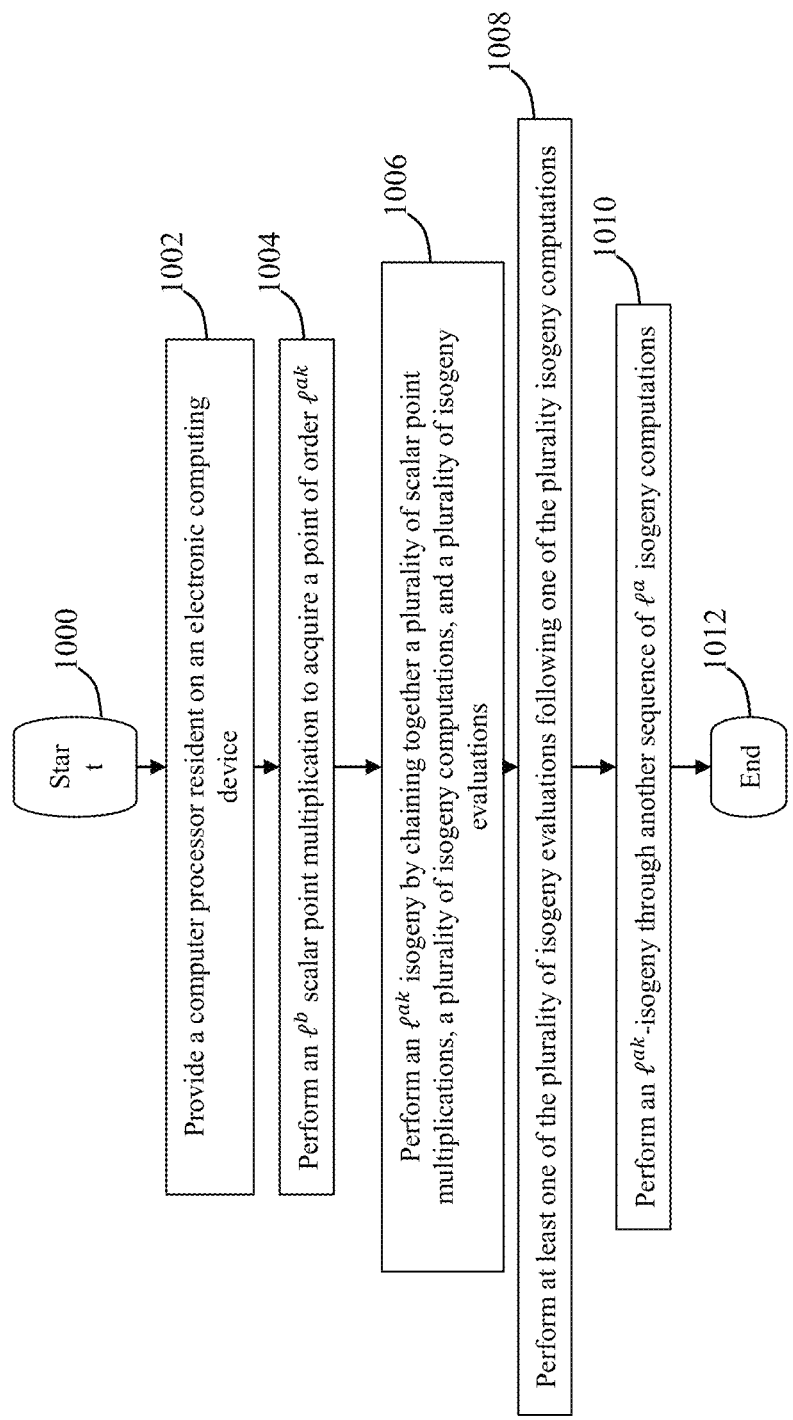
FIG. 9 is a process-flow diagram depicting a computer-implemented method for computing large-degree isogenies of a base degree raised to a power of form $\ell^{ak+b}$ in accordance with one embodiment of the present invention.

With reference to FIG. 9, an exemplary computer-implemented method for computing large-degree isogenies of a base degree raised to a power of form $\ell^{ak+b}$ is depicted, wherein the process starts at step 1000, and then immediately proceeds to the step 1002 of providing at least one computer processor resident on an electronic computing device. Step 1004 may include performing a $\ell^b$ scalar point multiplication to acquire a point of order $\ell^{ak}$, wherein the next step 1006 may include performing with the at least one processor a $\ell^{ak}$ isogeny by chaining together a plurality of scalar point multiplications, a plurality of isogeny computations, and a plurality of isogeny evaluations. Next, step 1008 includes performing with the at least one processor at least one of the plurality of isogeny evaluations following one of the plurality isogeny computations and step 1010 includes performing with the at least one processor an $\ell^{ak}$-isogeny through another sequence of $\ell^a$ isogeny computations. The process may terminate at step 1012.

What is claimed is:

1. A computer-implemented method for computing large-degree isogenies of a base degree raised to a power of form $\ell^{ak+b}$, where a, b, and c are integers with 0<b<a, comprising the steps of:

providing at least one hardware computer processor resident on an electronic computing device and operably configured to execute a sequence of computer readable instructions programmed to reduce computations when computing large-degree isogenies;

performing with the at least one hardware computer processor and through execution of the sequence of computer readable instructions, a large-degree isogeny of a base degree raised to a power of form $\ell^{ak+b}$, where a, b, and c are integers with 0<b<a, by chaining together a plurality of scalar point multiplications, a plurality of isogeny computations, and a plurality of isogeny evaluations, wherein the large-degree isogeny includes a sequence storing, inside the electronic computing device, at least one pivot point computed by one of the plurality of scalar point multiplications followed by an isogeny computation of degree $\ell^b$;

performing, with the at least one hardware computer processor and through execution of the sequence of computer readable instructions, at least one of the plurality of isogeny evaluations following one of the plurality isogeny computations; and performing with the at least one hardware computer processor and through execution of the sequence of computer readable instructions, an $\ell^{ak}$-isogeny through another sequence of $\ell^a$ isogeny computations.

2. The computer-implemented method according to claim 1, wherein the large-degree isogeny further comprises:
storing the at least one pivot point computed by one of the plurality of scalar point multiplications followed by the isogeny computation of a degree $\ell^b$ and the plurality of isogeny evaluations.

3. The computer-implemented method according to claim 1, wherein:
the base degree is a small prime number.

4. The computer-implemented method according to claim 1, wherein:
the integer a is 2 and the integer b is 1, resulting in a large-degree isogeny of an odd degree.

5. The computer-implemented method according to claim 1, wherein:
the large-degree isogeny is performed with arithmetic defined over a finite field of size that includes one of: $2^{216}3^{137}-1$, $2^{250}3^{159}-1$, $2^{305}3^{192}-1$, $2^{372}3^{239}-1$, or $2^{273}3^{172}-1$.

6. The computer-implemented method according to claim 1, wherein:
the large-degree isogeny is performed as part of an isogeny-based cryptosystem utilizing the hardware computer processor resident on the electronic computing device.

7. A computer-implemented method for computing large-degree isogenies of a base degree raised to a power of form $\ell^{ak+b}$, where a, b, and c are integers with 0<b<a, comprising the steps of:

providing at least one hardware computer processor resident on an electronic computing device and operably configured to execute a sequence of computer readable instructions programmed to reduce computations when computing large-degree isogenies;

performing a $\ell^b$ scalar point multiplication to acquire a point of order $\ell^{ak}$;

performing with the at least one hardware computer processor and through execution of the sequence of computer readable instructions, a $\ell^{ak}$ isogeny by chaining together a plurality of scalar point multiplications, a plurality of isogeny computations, and a plurality of isogeny evaluations;

performing with the at least one hardware computer processor and through execution of the sequence of computer readable instructions, at least one of the plurality of isogeny evaluations following one of the plurality isogeny computations; and performing with the at least one hardware computer processor and through execution of the sequence of computer readable instructions, an $\ell^{ak}$-isogeny through another sequence of $\ell^a$ isogeny computations.

8. The computer-implemented method according to claim 7, wherein:
the base degree is a small prime number.

9. The computer-implemented method according to claim 7, wherein:
the integer a is 2 and the integer b is 1, resulting in a large-degree isogeny of an odd degree.

10. The computer-implemented method according to claim 7, wherein:
the large-degree isogeny is performed with arithmetic defined over a finite field of size that includes one of: $2^{216}3^{137}-1$, $2^{250}3^{159}-1$, $2^{305}3^{192}-1$, $2^{372}\ 3^{239}-1$, $2^{191}3^{172}-1$, or $2^{273}3^{172}-1$.

11. The computer-implemented method according to claim 7, wherein:
the large-degree isogeny is performed as part of an isogeny-based cryptosystem utilizing the hardware computer processor resident on the electronic computing device.

12. A computer processing system for computing large-degree isogenies of a base degree raised to a power of form $\ell^{ak+b}$, where a, b, and c are integers with 0<b<a and comprising:

at least one hardware computer processor resident on an electronic computing device and operably configured to execute computer-readable instructions programmed to reduce computations when computing large-degree isogenies and to perform:

the large-degree isogeny of the base degree raised to the power of form $\ell^{ak+b}$ where a, b, and c are integers with 0<b<a, by chaining together a plurality of scalar point multiplications, a plurality of isogeny computations, and a plurality of isogeny evaluations, wherein the large-degree isogeny includes a sequence storing at least one pivot point computed by one of the plurality of scalar point multiplications followed by an isogeny computation of degree $\ell^b$;

at least one of the plurality of isogeny evaluations following one of the plurality isogeny computations; and an $\ell^{ak}$-isogeny through another sequence of $\ell^a$ isogeny computations.

13. The computer processing system according to claim 12, wherein the large-degree isogeny further comprises:
storing the at least one pivot point computed by one of the plurality of scalar point multiplications followed by the isogeny computation of a degree $\ell^b$ and the plurality of isogeny evaluations.

14. The computer processing system according to claim 12, wherein:
the base degree is a small prime number.

15. The computer processing system according to claim 12, wherein:
The integer a is 2 and the integer b is 1, resulting in a large-degree isogeny of an odd degree.

16. The computer processing system according to claim 12, wherein:
the large-degree isogeny is performed with arithmetic defined over a finite field of size that includes one of: $2^{216}3^{137}-1$, $2^{250}3^{159}-1$, $2^{305}3^{192}-1$, $2^{372}3^{239}-1$, 21913172-1, or $2^{273}3^{172}-1$.

17. The computer processing system according to claim 12, wherein:
the large-degree isogeny is performed as part of an isogeny-based cryptosystem utilizing the hardware computer processor resident on the electronic computing device.

* * * * *